United States Patent [19]
Geist et al.

[11] Patent Number: 4,781,808
[45] Date of Patent: Nov. 1, 1988

[54] AQUEOUS CATHODIC ELECTROCOATING MATERIAL AND A PROCESS FOR COATING AN ELECTRICALLY CONDUCTIVE SUBSTRATE

[75] Inventors: Michael Geist, Münster; Georg Schön, Everswinkel; Arnold Dobbelstein; Güther Ott, both of Münster, all of Fed. Rep. of Germany

[73] Assignee: BASF Lacke & Farben Aktiengesellschaft, Münster, Fed. Rep. of Germany

[21] Appl. No.: 878,835
[22] PCT Filed: Aug. 2, 1985
[86] PCT No.: PCT/DE85/00261
§ 371 Date: Apr. 30, 1986
§ 102(e) Date: Apr. 30, 1986
[87] PCT Pub. No.: WO86/01526
PCT Pub. Date: Mar. 13, 1986

[30] Foreign Application Priority Data
Sep. 1, 1984 [DE] Fed. Rep. of Germany ....... 3432233

[51] Int. Cl.$^4$ .............................................. C25D 13/20
[52] U.S. Cl. ................................ 204/181.7; 523/409; 523/410; 523/415
[58] Field of Search ...................... 523/415, 409, 410; 204/81.4, 181.7

[56] References Cited
U.S. PATENT DOCUMENTS

| | | | |
|---|---|---|---|
| 4,104,147 | 8/1978 | Marchetti | 204/181.7 |
| 4,252,703 | 2/1981 | Patzschke | 260/29.2 EP |
| 4,254,161 | 6/1981 | Feuerhahn | 523/414 |
| 4,364,860 | 12/1982 | Patzschke | 525/127 |
| 4,397,990 | 8/1983 | Kooymans | 525/167 |
| 4,401,774 | 8/1983 | Kooymans | 523/402 |
| 4,405,763 | 9/1983 | Kooymans | 525/438 |
| 4,423,167 | 12/1983 | Valko | 523/414 |
| 4,423,168 | 12/1983 | Valko | 523/414 |
| 4,440,612 | 4/1984 | Valko | 204/181 C |
| 4,511,447 | 4/1985 | Valko | 204/181 C |
| 4,595,717 | 6/1986 | Patzschke | 523/414 |
| 4,600,485 | 7/1986 | Patzschke | 204/181.7 |

FOREIGN PATENT DOCUMENTS

| | | |
|---|---|---|
| 0004090 | 9/1979 | European Pat. Off. . |
| 0083232 | 7/1983 | European Pat. Off. . |
| 0102566 | 3/1984 | European Pat. Off. . |

OTHER PUBLICATIONS

PCT preliminary examination report PCT/DE85/00261 dated Sep. 25, 1986.

Primary Examiner—C. Warren Ivy
Attorney, Agent, or Firm—Kenyon & Kenyon

[57] ABSTRACT

The invention relates to an aqueous cathodic electrocoating material which contains a synthetic resin binder containing amino and/or hydroxyl groups and capable of being rendered water-soluble by the addition of an acid. The synthetic resin binder contains a mixture of crosslinking agents, as well as pigments, fillers, corrosion inhibitors, surface coating assistants, if appropriate catalysts, and organic solvents in an amount of up to 15% by weight, based on the total weight of the coating material. The mixture of crosslinking agents consists of at least two crosslinking agents which possess different reactivities and are based on activated esters and/or polyisocyanates blocked with different blocking agents. Different reactivities means that the crosslinking reactions begin at temperatures which are at least 10° C. apart. The crosslinking reagent which reacts first is present in an amount of from 15 to 60 mol %, based on the mixture of crosslinking agents.

2 Claims, No Drawings

AQUEOUS CATHODIC ELECTROCOATING MATERIAL AND A PROCESS FOR COATING AN ELECTRICALLY CONDUCTIVE SUBSTRATE

The invention relates to an aqueous cathodic electrocoating material which contains a synthetic resin binder, which contains amino and/or hydroxyl groups and can be rendered water-soluble by protonation with acids, and a mixture of crosslinking agents, as well as pigments, fillers, corrosion inhibitors, surface coating assistants, if necessary catalysts, and organic solvents in an amount of up to 15% by weight, based on the total weight of the coating material.

Over the past few years, cathodic electrocoating has increasingly replaced anodic electrocoating, particularly for priming car bodies. For this purpose, a large number of binder systems are available on the market. The binder systems are either self-crosslinking or externally crosslinking. The externally crosslinking systems have become more important since they have a wider range of applications. Such externally crosslinking binder systems are described in, for example, German Laid-Open Application DOS No. 2,701,002, EP-A No. 12,463 and German Pat. No. 3,108,073. Thus, for example, German Laid-Open Application DOS No. 2,701,002 describes a water-dispersible cationic synthetic resin and its use for coating an electrically conductive substrate which has been made the cathode. The synthetic resin used is the ungelled reaction product of a polyepoxide, a secondary amine and an organic polyol having at least two primary hydroxyl groups.

The coating materials contain crosslinking agents or curing agents. Blocked polyisocyanates are preferred externally crosslinking crosslinking agents. They react with the reactive amino or hydroxyl groups only when the coated article has been heated to a fairly high temperature which is sufficient to eliminate the blocking of the isocyanate. Mixtures of different polyisocyanates are also used for this purpose.

EP-B No. 4 090 likewise describes an aqueous cathodic electrocoating material which consists of a synthetic resin binder which possesses amino groups and can be rendered water-soluble by the addition of an acid, and of a crosslinking agent containing ester groups, which react with the primary and/or secondary amino groups of the synthetic resin binder in a basic medium at temperatures above 140° C. with amide formation. In order to vary the performance characteristics, further modifying resins, e.g. blocked isocyanates, are, if appropriate, also incorporated into the emulsion in a small amount. With the aid of such externally crosslinking binder systems, deposited films having an acceptable surface can be produced. Nevertheless, there is still an urgent need for these surfaces to be improved substantially so that, where necessary, a two-coat process can be used for the total coating. A frequent cause of the surface defects in films is that roughness of the sheet metal substrate to be coated is visible through the baked film and appears at the surface of the latter. This also results in a top coat with a defective surface. Thus, the substrate roughness is projected upward.

It is therefore the object of the invention to avoid reproducing the substrate defects in the baked film and to provide an electrocoating material which leads to better surface quality.

Surprisingly, it has been found that this object is achieved by an electrocoating material which contains an externally crosslinking synthetic resin binder and a mixture of crosslinking agents which have different reactivities. The present invention therefore relates to an electrocoating material of the type stated at the outset, wherein the mixture of the crosslinking agents contains at least two crosslinking agents which possess different reactivities and are based on activated esters and/or on polyisocyanates blocked with different blocking agents, and different reactivities means that, when the mixture is heated, the crosslinking reaction begins at temperatures at least 10° C. apart, and the crosslinking agent which reacts first is present in an amount of from 15 to 60 mol %, based on the mixture of the crosslinking agents.

Differential scanning calorimetry (DSC) is suitable for determining the start of the crosslinking reaction. This calorimetric method has proven very satisfactory for investigating resins and polymer materials and is frequently employed. The method is described in, for example, Ke Bacon Newer Methods of Polymer Characterization, John Wiley & Sons, New York 1964 and

D. Schultze: Differentialthermoanalyse, Verlag Chemical Weinheim 1969.

In another method familiar to the skilled worker in the surface coatings sector, the different crosslinking agents are mixed with a standard binder and the mixture is used to prepare a surface coating. These coatings can be used to produce films, and the latter can be baked at different temperatures. The baked films are then rubbed with solvent. This test establishes the baking temperature at which the films are no longer attacked by the solvent after, for example, 20 double strokes with a solvent-impregnated cottonwool ball. Thus, a sequence of different crosslinking agents can be obtained in a very simple manner. The test binder chosen is advantageously the binder which is also subsequently to be present in the mixture of crosslinking agents.

At the beginning of the crosslinking process, the viscosity of the surface coating film increases dramatically. This effect can be employed very satisfactorily for defining the beginning of crosslinking. Test apparatuses available for determining the viscosity or the increase in viscosity are the conventional rotation viscometers and plate-and-cone viscometers. Another very suitable possible method for monitoring the viscosity during the baking process is the rolling sphere technique. The theoretical principles and the procedure are described in detail by, for example, GÖRING, DINGERDISSEN and HARTMANN in Farbe und Lack 83rd year, No. 4, 1977, pages 270–277. During the baking process, the viscosity of the surface coating film initially falls as a result of a temperature increase. This process ends with the onset of crosslinking, and the viscosity then increases very rapidly. The viscosity minimum observed in this procedure may be regarded as the beginning of the effective crosslinking.

The different reactivities of the crosslinking agents, which arise either as a result of different crosslinking agents or as a result of different blocking agents, cause the crosslinking reactions during baking to begin at temperatures at least 10° C. apart.

Particularly suitable epoxy resins for the binders of the electrocoating materials according to the invention are a wide variety of epoxy resins, as described, inter alia, in the patent publications German Pat. No. 2,701,002, EP-B No. 4 090, German Pat. No. 3,108,073 and Patent Application EP-A No. 12 463. There, and in other publications as well, other groups of binders suitable for use according to the invention are also mentioned. However, because of the particularly good corrosion protection, the epoxy resins are currently preferred.

Cationic water-dispersible synthetic resins as binders for electrocoating finishes are known. Thus, for example, German Laid-Open Application DOS No. 2,701,002 describes a resin of this type which is a reaction product of a polyepoxide, a secondary amine and an organic polyol having at least 2 alcoholic primary hydroxyl groups. The resins are formed by chain extension of high molecular weight polyepoxides having at least 2 epoxide groups per molecule. Chain lengthening is achieved by means of an organic polyol, and water-dispersibility by means of an addition reaction with a secondary amine.

German Laid-Open Application DOS No. 3,108,073 describes a binder for electrocoating, the presence of this binder giving relatively thick layers. The binders used are reaction products of (A) low molecular weight epoxy resins containing aromatic groups, (B) aliphatic and/or alicyclic polyfunctional alcohols and/or carboxylic acids having a molecular weight of less than 350, (C) if required, up to 60% by weight, based on the total binder, of polyfunctional alcohols, carboxylic acids and/or SH compounds having a molecular weight of from 500 to 5000 and (D) primary, secondary and/or tertiary amines and/or their salts or a sulfide/acid mixture or a phosphine/acid mixture.

Materials which contain two or more epoxide groups in the molecule can be used as polyepoxides (component A). Preferred compounds are those containing two epoxide groups in the molecule. The polyepoxides have a relatively low molecular weight of not more than 750, preferably 400–500. The polyepoxides can be, for example, polyglycidyl ethers of polyphenols, such as bisphenols, advantageously, for example, bisphenol A. These polyepoxides can be prepared by etherification of a polyphenol with an epihalohydrin in the presence of an alkali. Examples of suitable phenol compounds are 2,2-bis-(4-hydroxyphenyl)-propane, 4,4'-dihydroxybenzophenone, 1,1-bis-(4-hydroxyphenyl)ethane, 1,1-bis-(4-hydroxyphenyl)-isobutane, 2,2-bis-(4-hydroxy-tert.-butylphenyl)-propane, bis-(2-hydroxynaphthyl)methane, 1,5-dihydroxynaphthalene and hydantoin epoxides.

Another suitable class of polyepoxides are polyglycidyl ethers of phenolic novolak resins.

Polyglycidyl esters of aromatic polycarboxylic acids can also advantageously be used.

Aliphatic and/or alicyclic polyfunctional alcohols or carboxylic acids having a molecular weight of less than 350 are employed as component B.

Examples are: diols, such as ethylene glycol, diglycol, dipropylene glycol, dibutylene glycol, triglycol, 1,2-propanediol, 1,3-propanediol, 2,2-dimethyl-1,3-propanediol, 2,2-diethyl-1,3-propanediol, 2-methyl-2-ethyl-1,3-propanediol, 2-methyl-2-propyl-1,3-propanediol, 2-ethyl-2-butyl-1,3-propanediol, 1,2-butanediol, 1,4-butanediol, 2,3-butanediol, 2-ethyl-1,4-butanediol, 2,2-diethyl-1,3-butanediol, but-2-ene-1,4-diol, 1,2-pentanediol, 1,5-pentanediol, 3 methyl-1,5-pentanediol, 1,6-hexanediol, 2,5-hexanediol, 2-ethyl-1,3-hexanediol, 2,5-dimethyl-2,5-hexanediol, 1,3-octanediol, 4,5-nonanediol, 2,10-decanediol, 2-hydroxyethyl hydroxyacetate, 2,2-dimethyl-3-hydroxypropyl 2,2-dimethylhydroxypropionate, 2-methyl-2-propyl-3-hydroxypropyl 2-methyl-2-hydroxypropionate, 4,4'-methylenebiscyclohexanol and 4,4'-isopropylidenebiscyclohexanol. Some preferred diols are 2,2-dimethyl-1,3-propanediol, 3-methyl-1,5-pentanediol, 2,2-dimethyl-3-hydroxypropyl 2,2-dimethylhydroxypropionate and 4,4'-isopropylidenebiscyclohexanol.

Suitable carboxylic acids are a large number of dicarboxylic acids, such as oxalic acid, malonic acid, 2,2-dimethylmalonic acid, succinic acid, glutaric acid, adipic acid, hexahydrophthalic acid, maleic acid, fumaric acid, pimelic acid, suberic acid, azelaic acid, sebacic acid, itaconic acid, citraconic acid, mesaconic acid and glutaconic acid.

Preferably used dicarboxylic acids are, for example, 2,2-dimethylmalonic acid and hexahydrophthalic acid.

Polyfunctional alcohols, carboxylic acids and SH compounds are suitable as component C. These include diols, triols and higher polymeric polyols, such as polyesterpolyols and polyetherpolyols. Polyesterpolyols are particularly preferred, especially the polycaprolactonepolyols. It is known that the polyesterpolyols can be prepared by polyesterification of organic polycarboxylic acids or their anhydrides with organic polyols which contain primary hydroxyl groups. Usually, the polycarboxylic acids and the polyols are aliphatic or aromatic dicarboxylic acids and diols.

The diols used for the preparation of the polyesters include alkylene glycols, such as ethylene glycol and butylene glycol, neopentylglycol and other glycols, such as cyclohexanedimethanol.

The acid component of the polyester primarily consists of low molecular weight carboxylic acids or their anhydrides having 2 to 18 carbon atoms in the molecule.

Examples of suitable acids are phthalic acid, isophthalic acid, terephthalic acid, tetrahydrophthalic acid, hexahydrophthalic acid, adipic acid, azelaic acid, sebacic acid, maleic acid, glutaric acid, hexachloroheptanedicarboxylic acid and tetrachlorophthalic acid. Instead of these acids, it is also possible to use their anhydrides, where these exist.

Suitable polyesterpolyols are those which are derived from lactones.

The amine used as component D for the reaction with the epoxide compound can be a primary, secondary or tertiary amine, secondary amines being particularly suitable. Preferably, the amine should be water-soluble. Examples of such amines are mono- and dialkylamines, such as methylamine, ethylamine, propylamine, butylamine, dimethylamine, diethylamine, dipropylamine, methylbutylamine and the like. Polyamines having primary and secondary amino groups can be reacted in the form of their ketimines with the epoxide groups. The reaction of the amine with the epoxide groups frequently takes place as soon as the starting substances are mixed. Heating at from 50° to 150° C. may be necessary.

For the reaction with the epoxide-containing compound, the amine must be used in an amount which is at least sufficient to enable the resin to assume a cationic character, i.e. it migrates to the cathode in the coating bath under the influence of a voltage when it has been rendered soluble by the addition of an acid. Acids suitable for neutralizing the amines include boric acid, lactic acid, formic acid, acetic acid, propionic acid, butyric acid and hydrochloric acid. Hence, the modification with amino groups has the purpose of rendering the binder water-soluble and cationic.

In the case of a binder of the electrocoating material according to the invention, modification with ketimines has also proven particularly useful. Ketimines are known to be the reaction product of primary amines with ketones. After the resin has been dispersed in the water, free primary amino groups can be produced in the resin in this manner or by other methods which will not be described here.

The epoxy resins furthermore contain free hydroxyl groups, which are introduced by a selective synthesis route. Thus, the conventional and commercially relevant binders contain hydroxyl groups and frequently also amino groups available for crosslinking with an added external crosslinking agent. These and other known cationic binders can be used in the present invention. In order to obtain highly stable coatings using the binders described, a crosslinking agent which crosslinks the binder at elevated temperatures is added to the electrocoating material. The crosslinking agents which are suitable for the novel mixture of crosslinking agents must therefore be reactive toward hydroxyl and amino groups.

Examples of crosslinking components which are suitable for the electrocoating material according to the invention are blocked polyisocyanates, as described in German Published Application DAS No. 2,057,799 and German Laid-Open Application DOS No. 3,108,073.

The blocked polyisocyanates are stable at room temperature, and the blocking groups are removed only at elevated temperatures. During the baking process, the liberated polyisocyanates can then react both with the hydroxyl groups produced by opening of the epoxide rings, urethanes being formed, and with the free amino groups of the binder, urea being formed. As a rule, the crosslinking agent or the mixture of crosslinking agents accounts for from about 5 to 60% by weight of the binder, preferably from 20 to about 40% by weight of the binder. In the invention, it is possible to use any polyisocyanates in which the isocyanate groups have been reacted with a compound so that the blocked polyisocyanate formed is stable to hydroxyl groups at room temperature but reacts at elevated temperatures, as a rule from about 90° to about 300° C.

In the preparation of the blocked polyisocyanates, it is possible to use any organic polyisocyanates suitable for crosslinking. The isocyanates which contain from about 3 to about 36, in particular from about 8 to about 15 carbon atoms are preferred. Examples of suitable diisocyapates are trimethylene diisocyanate, tetramethylene diisocyanate, pentamethylene diisocyanate, hexamethylene diisocyanate, propylene diisocyanate, ethylethylene diisocyanate, 2,3-dimethylethylene diisocyanate, 1-methyltrimethylene diisocyanate, 1,3-cyclopentylene diisocyanate, 1,4-cyclohexylene diisocyanate, 1,2-cyclohexylene diisocyanate, 1,3-phenylene diisocyanate, 1,4-phenylene diisocyanate, 2,4-toluylene diisocyanate, 2,6-toluylene diisocyanate, 4,4'-biphenylene diisocyanate, 1,5-naphthylene diisocyanate, 1,4-naphthylene diisocyanate, 1-isocyanatomethyl-5-isocyanato-1,3,3-trimethylcyclohexane, bis-(4-isocyanatocyclohexyl)-methane, bis-(4-isocyanatophenyl)-methane, 4,4'-diisocyanatodiphenyl ether and 2,3-bis-(8-isocyanatooctyl)-4-octyl-5-hexylcyclohexene. It is also possible to use polyisocyanates having a higher isocyanate functionality. Examples of these are tris-(4-isocyanatophenyl)-methane, 1,3,5-triisocyanatobenzene, 2,4,6-triisocyanatotoluene, 1,3,5-tris-(6-isocyanatohexyl)-biuret and bis-(2,5-diisocyanato-4-methylphenyl)-methane, and polymeric polyisocyanates, such as dimers and trimers of diisocyanatotoluene.

For blocking the polyisocyanates, any suitable aliphatic, cycloaliphatic or aromatic alkylmonoalcohols can be used. Examples of these are aliphatic alcohols, such as methyl, ethyl, chloroethyl, propyl, butyl, amyl, hexyl, heptyl, octyl, nonyl, 3,3,5-trimethylhexyl, decyl and lauryl alcohol, cycloaliphatic alcohols, such as cyclopentanol and cyclohexanol, and aromatic alkylalcohols, such as phenylcarbinol and methylphenylcarbinol. Small amounts of fairly high molecular weight and relatively sparingly volatile monoalcohols can, if required, also be used, these alcohols, after they have been eliminated, acting as plasticizers in the coatings.

The blocked polyisocyanates are prepared by reacting a sufficient amount of an alcohol with the organic polyisocyanate so that free isocyanate groups are no longer present. The reaction between the organic polyisocyanate and the blocking agent is exothermic. Hence, the polyisocyanate and the blocking agent are preferably mixed at a temperature which is no higher than 80° C., in particular lower than 50° C.

The chemistry of the blocked isocyanates is based on the equilibrium reaction involving urethane formation, this reaction being reversible at relatively high temperatures. By reacting isocyanates with suitable compounds, it is therefore possible for the NCO groups to be blocked, and regenerated again, as required, by heating. Since, in contrast to the free isocyanates, the blocked isocyanates do not react at room temperature, the mixtures prepared using polyethers or polyesters containing hydroxyl groups have a long shelf life. Single-component polyurethane coatings of this type are "baking systems" which undergo crosslinking only at relatively high temperatures, with elimination of the blocking agent. The tendency of the blocked isocyanates to undergo thermal dissociation is dependent on both the isocyanate component and the chemical structure of the blocking agent. The most thermally stable compounds are urethanes obtained from aliphatic isocyanates and primary alcohols, which undergo cleavage only at about 230° C. The urethanes obtained from the aromatic isocyanates with primary alcohols are less stable. The phenylurethanes obtained from the aromatic isocyanates undergo cleavage most readily.

The temperature range in which cleavage occurs to give the isocyanate again can be determined by heating the dissolved cleaving compound with a solution of cellulose acetate.

In a similar manner, aliphatic amines can be used as blocking agents for polyisocyanates.

Reacting polyisocyanates with the alcohol or amine blocking agents gives urethne or urea groups, which release the blocking agent again under the baking conditions and are then able to react with the reactive groups in the binder, with crosslinking.

Since the elimination temperatures for blocked polyisocyanates depend in each case on the blocking agent and on the type of isocyanate, crosslinking agents possessing different reactivities can be obtained in the case of the electrocoating material according to the invention by using different blocking agents for a particular isocyanate obviously, a mixture of crosslinking agents possessing different reactivities can also be obtained by using a mixture of blocked aliphatic polyisocyantes and blocked aromatic polyisocyanates.

In the case of the electrocoating material according to the invention, either different alcohols, different amines or alcohols and amines simultaneously are employed as blocking agents for polyisocyanates.

Another group of suitable crosslinking agents comprises the group consisting of crosslinking agents which effect crosslinking by transesterification or amidation.

The reactive ester group can be activated both in the acid moiety and in the alcohol moiety. Examples of this are transesterification crosslinking agents which are described in U.S. Pat. No.'s 4,397,990; 4,401,774; and 4,405,763; and which are activated in the alcohol moiety by a $\beta$-hydroxyl group. U.S. Pat. No. 4,477,530 describes crosslinking by aminolysis of crosslinking agents containing $\beta$-hydroxyalkyl ester groups. U.S. Pat. No.'s 4,423,167; 4,423,168; 4,423,169; 4,440,612 and 4,511,447 describes crosslinking by $\beta$-alkoxy esters, $\beta$-ester groups and $\beta$-aminogroups and by activating groups in the $\gamma$- and $\delta$-positions. The mixture of crosslinking agents for the electrocoating material according to the invention may also simultaneously consist of blocked polyisocyanates and crosslinking agents possessing activated ester groups.

EP-B 4 090 (see U.S. Pat. No.'s 4,252,703 and 4,364,860) describes a mixture of crosslinking agents which consists not only of activated ester components but also of small amounts of other crosslinking agents, such as blocked isocyanates. It has been found that the addition of small amounts of other crosslinking agents to activated esters does not lead to an improvement in the surface quality of the baked films. Regarding the statement in EP-B No. 4 090, to the effect that the admixed crosslinking agents are to be used only in small amounts, it was not obvious that crosslinking agents possessing different reactivities should be mixed in the claimed molar ratios, since an improvement in the surface quality could not be foreseen.

During the baking process, the different reactivities of the crosslinking agents caused them to react in stages, i.e. at different times and at different baking temperatures. In the case of the electrocoating material according to the invention, the temperatures at which the crosslinking reaction of the crosslinking agents of different reactivities begins are at least 10° C. apart.

The crosslinking agent which reacts first establishes good leveling properties before shrinkage of the entire film over the irregularities of the metallic substrate can occur. The crosslinking agent which then becomes effective serves for final crosslinking of the previously fixed, gel-like surface coating film. If only one crosslinking component is employed, the shrinkage process takes place during baking in such a way that the irregularities in the metallic substrate are projected upward.

The invention also relates to a process for coating an electrically conductive substrate, in which the substrate is immersed in an aqueous bath based on a cationic synthetic resin binder which is at least partially neutralized with an acid, possesses amino and/or hydroxyl groups and contains a mixture ff crosslinking agents, as well as pigments, fillers, corrosion inhibitors, surface coating assistants, if appropriate catalysts, and organic solvents in an amount of up to 15% by weight, based on the total weight of the coating agent, and the substrate is made the cathode, a film is deposited on the substrate using direct current, the substrate is removed from the bath and the film is cured by baking, wherein the mixture of the crosslinking agents contains at least two crosslinking agents which possess different reactivities and are based on activated esters and/or polyisocyanates blocked with different blocking agents, and different reactivities means that the crosslinking reaction during heating begins at temperatures which are at least 10° C. apart, and the crosslinking agent which reacts first is present in an amount of from 15 to 60 mol %, based on the mixture of crosslinking agents. Advantageous embodiments of the process according to the invention are described in claims 2 to 7.

The invention is illustrated in more detail below with reference to examples. Parts and percentages are by weight, unless expressly stated otherwise.

(A) Preparation of the crosslinking agents
(a) Preparation of crosslinking agent I A reactor equipped with a heating apparatus, a cooler, a stirrer, a thermometer, an outlet line leading to a washing apparatus, and an apparatus for passing in nitrogen is charged with 12280 parts of toluylene diisocyanate (mixture of about 80% of 2,4-toluylene diisocyanate and about 20% of 2,6-toluylene diisocyanate). Nitrogen is passed in, and the cooler is switched on. 5550.5 parts of 2-ethylhexanol are added gradually in the course of 5 hours, the temperature gradually increasing to 50° C. While the temperature of 50° C. is maintained, a further 3649.5 parts of 2-ethylhexanol are added in the course 4 hours. The reaction mixture is kept at 50° C. for 75 minutes, after which the cooler is switched off, and 3.6 parts of dibutyl-tin dilaurate are added. The heating apparatus is switched on, and the reaction mixture is heated to 65.6° in the course of 45 minutes. 3184 parts of 1,1,1-trimethylolpropane are added in the course of 2 hours 50 minutes, the temperature increasing from 65.6° to 120° C. The reaction mixture is kept at this temperature for 90 minutes, after which 10560 parts of 2-ethoxyethanol are added. The product formed is a solution of a polyurethane crosslinking agent.

The minimum baking temperature of this polyurethane crosslinking agent is 165° C.

(b) Preparation of crosslinking agent II 2360 g of the glycidyl ester of 2-methyl-2-ethylheptanoic acid are heated with 2073 g of trimellitic anhydride to 130° C. in a reaction vessel. The strongly exothermic reaction begins during this procedure. By external cooling, the reaction mixture is kept at 150° C. until an acid number of 183 is reached. Thereafter, it is cooled to 90° C., and 1450 g of methyl isobutyl ketone are added. 835 g of propylene oxide are then slowly added dropwise. At an acid number of 2, the reaction is terminated. The solids content of the resin solution is brought to 70% with further methyl isobutyl ketone. The minimum baking temperature of this crosslinking agent is 180° C.

(c) Preparation of crosslinking agent III 2599 parts of Desmodur N (trimerized hexamethylene diisocyanate, 75% strength in ethylglycol acetate/xylene) are initially taken in a suitable reactor and blanketed with nitrogen. 1290 parts of dibutylamine are then added dropwise in the course of 6 hours. During this procedure, the temperature is kept below 45° C. Thereafter, the mixture is cooled to room temperature and the solution of the crosslinking agent is filtered. The minimum baking temperature of this polyurethane crosslinking agent is 140° C.

(B) Preparation of the synthetic resin binders
(a) Preparation of binder I

The binder is prepared similarly to Example A of EP-A No. 70 550. 1019 parts of a commercial epoxy resin based on bisphenol A (epoxide equivalent weight 485), 39 parts of xylene and 265 parts of a polycaprolactonepolyol (obtainable under the tradename PCP 0200 from Union Carbide Corp.) are initially taken in a suitable reactor. The mixture is refluxed, and kept at the reflux temperature for 30 minutes. Thereafter, it is cooled to 140° C., and 3.85 parts of dimethylbenzylamine are added. The reaction mixture is then kept at 130° C. for 2.5 hours.

(b) Preparation of binder II 1024 parts of a commercial epoxy resin based on bisphenol A (epoxide equivalent weight 188), 142 parts of neopentylglycol and 40 parts of xylene are initially taken in a suitable reactor and heated to 125° C. 4.1 parts of dimethylbenzylamine are added, and the temperature is allowed to increase to 130° C. This temperature is maintained until an epo.ide equivalent weight of 425 is reached, and 366 parts of a polycaprolactone polyol (obtainable under the tradename PCP 0200 from Union Carbide Corp.) and 3.1 parts of dimethylbenzylamine are added. The temperature is kept at 130° C. until the epoxide equivalent weight has reached 1085.

(c) Preparation of binder III 992 parts of Epikote 1001 (epoxide equivalent weight 495) and 1814 parts of Epikote 1055 (epoxide equivalent weight 910, both substances commercial products from Shell, epoxy resins based on bisphenol A) are initially taken together with 864 parts of methyl isobutyl ketone in a suitable reactor and are heated. At 117° C., a vacuum is applied and water is separated off. Thereafter, the mixture is cooled to 70° C., and 210 parts of diethanolamine are added. During this procedure, the temperature increases to 80° C. The temperature is maintained for hours, after which 630 parts of a reaction product of 1 mole of hexamethylenediamine and 2 moles of Cardura 10, the glycidyl ester of saturated $C_{10}$ monocarboxylic acids, wherein the alpha-carbon atom is attached to three alkyl groups, at least one of which is always methyl are added. The mixture is then heated for 7 hours at 120° C. 141 parts of hexylglycol and 446 parts of xylene are then mixed in.

(C) Preparation of a gray pigment paste 800 parts of butylglycol are added to 953 parts of a commercial epoxy resin based on bisphenol A and having an epoxide equivalent weight of 8%. The mixture is heated to 80° C. 221 parts of a reaction product of 101 parts of diethanolamine and 120 parts of 80% strength aqueous lactic acid are then added to the resin solution. The reaction is carried out at 80° C. until the acid number has fallen below 1.

1800 parts of this product are initially taken together with 2447 parts of deionized water, and mixed with 2460 parts of titanium dioxide, 590 parts of an extender based on aluminum silicate, 135 parts of lead silicate and 37 parts of carbon black. This mixture is comminuted to a Hegman fineness of from 5 to 7 in a mill. 1255 parts of deionized water are then added in order to achieve the desired paste consistency. The gray paste has a very long shelf life.

EXAMPLE

General description of the preparation of the electrocoating materials.

Coats of electrocoating material are produced using the dispersions described in the Examples below. To do this, 2000 parts by weight of each of the binder dispersions are mixed with 775 parts by weight of the gray pigment paste. The solids content of the bath is brought to 20% (150° C., 30 minutes) with deionized water. The stirred bath is then allowed to age for 3 days. The surface coating films are deposited in the course of 2 minutes onto zinc-phosphatized metal sheet. The voltage was chosen so that typical layer thicknesses are achieved for the individual binders. The bath temperature is 27° C. The films deposited are baked at 180° C. for 20 minutes.

EXAMPLE 1

802 parts of the polyurethane crosslinking agent I are added to binder I. After hexylglycol has been added and worked in, 201 parts of crosslinking agent II and 12 parts of lead octoate are also added and are mixed in for 15 minutes. 2350 parts of the batch are dispersed with 3015 parts of deionized water, 24.7 parts of glacial acetic acid and 48.3 parts of an emulsifier solution in another reactor.

EXAMPLE 2

971 parts of crosslinking agent I are added to binder II. Before the dispersing procedure, 2290 parts of the resin solution are mixed with 210 parts of crosslinking agent III. Thereafter, the resin solution is dispersed in 3439 parts of deionized water, 39 parts of glacial acetic acid and 23 parts of emulsifier solution.

EXAMPLE 3

452 parts of crosslinking agent II and 194 parts of crosslinking agent III and 60 parts of lead octoate are added to 1854 parts of binder III, and the mixture is then dispersed in 3220 parts of deionized water and 35 parts of glacial acetic acid.

COMPARATIVE EXAMPLE 1

1003 parts of the polyurethane crosslinking agent I are added to binder I. The reaction mixture is cooled to 110° C. as a result, and 64 parts of methylethanolamine and 40 parts of a 70% strength solution of the methylisobutyldiketimine of diethylenetriamine are added. The diketimine is obtained from 1 mole of diethylenetriamine and 2 moles of methyl isobutyl ketone. The preparation is described in U.S. Pat. No. 3,523,925. The reaction mixture is then kept at 115° C. for 1 hour. The reaction mixture is then diluted with 104 parts of hexylglycol and kept at 115° C. for a further hour Thereafter, 2350 parts of the batch are dispersed with 3015 parts of deionized water, 24.7 parts of glacial acetic acid and 840.3 parts of an emulsifier solution in another reactor.

COMPARATIVE EXAMPLE 2

1189 parts of crosslinking agent I are mixed with the binder II described above. This causes the temperature to fall. 107 parts of the abovementioned ketimine and 80 parts of methylethanolamine are added. This causes the temperature to increase again. The mixture is kept at 115° C. for 1 hour, and 76 parts of phenoxypropanol and 38 parts of ethylglycol are added, and mixed in for 15 minutes. 2500 parts of this resin solution are then dispersed in 3439 parts of deionized water, 39 parts of glacial acetic acid and 23 parts of emulsifier solution.

COMPARATIVE EXAMPLE 3

646 parts of crosslinking agent II and 60 parts of lead octoate are added to 1854 parts of binder III, and the mixture is then dispersed in 3220 parts of deionized water and 35 parts of glacial acetic acid.

| Evaluation of the baked films | | | |
|---|---|---|---|
| | Binder | Crosslinking agent | Levelness* | DOI** |
| Example 1 | I | I + II | 0.5 | 85 |
| Example 2 | II | I + III | 0 | 93 |
| Example 3 | III | II + III | 1 | 89 |
| Comparative example 1 | I | I | 2 | 67 |
| Comparative example 2 | II | I | 2 | 62 |
| Comparative example 3 | III | II | 3 | 58 |

*0 = best value 5 = poorest value
**DOI = distinctness of reflected image
For this measurement, the primed metal sheets were coated with a 50 μm thick acrylate topcoat.

The DOI value is determined in a relative measurement, and is a measure of the gloss characteristics of a surface which exhibits virtually ideal reflection. In the measurement, the measured value at maximum reflection (i.e. the angle of incidence of a light beam is equal to the angle of reflection) and the measured value obtained when the angles differ by 0.3° are expressed as a ratio.

We claim:

1. An aqueous cathodic electrocoating material comprising a synthetic resin binder having amino groups or a mixture of amino groups and hydroxyl groups, a crosslinker mixture of a pair of crosslinking agents, a pigment, and additive agents selected from the group consisting of a filler, a corrosion inhibitor, a surface coating additive, a catalyst, and an organic solvent in an amount of up to 15% by weight, based on the total weight of the electrocoating material, said binder being capable of being rendered watersoluble in aqueous acid; wherein the pair of crosslinking agents of the crosslinker mixture is an aliphatic polyisocyanate blocked with an aliphatic cycloaliphatic or aromaticalkyl monoalochol and an aromatic polyisocyanate blocked with an aliphatic, cycloaliphatic or aromatic alkyl monoalcohol or an aliphatic amine the two crosslinking agents having differing crosslinking reactivities so that the crosslinking reaction of the blocked aliphatic polyisocyanate is initiated at a temperature which is at least 10° C. apart from that of the blocked aromatic polyisocyanate, and the crosslinking agent which reacts first is present in an amount of from 15 to 60 mol %, based on the mixture of the crosslinking agents.

2. A process for coating an electrically conductive substrate, which comprises:
immersing the substrate in an acidic aqueous bath comprising a cationic synthetic resin binder having amino groups or a mixture of amino groups and hydroxyl groups, a crosslinker mixture of two crosslinking agents, pigments, and additive agents selected from the group consisting of a filler, a corrosion inhibitor, a surface coating additive, a catalyst, and an organic solvent in an amount of up to 15% by weight, based on the total weight of the electrocoating material;
making the substrate the cathode for electrodeposition,
depositing a film on the substrate by means of direct current,
removing the substrate from the bath, and
curing the film;
said pair of crosslinking agents of the crosslinker mixture being an aliphatic polyisocyanate blocked with an aliphatic cycloaliphatic or aromatic alkyl monoalochol or an aliphatic amine, and an aromatic polyisocyanate blocked with an aliphatic, cycloaliphatic or aromaticalkyl monoalcohol or an aliphatic amine the pair of crosslinking agents having different reactivities so that the crosslinking reaction of the blocked aliphatic polyisocyanates is initiated at a temperature which is at least 10° C. apart from that of the blocked aromatic polyisocyanate, and the crosslinking agent which reacts first is present in an amount of from 15 to 60 mol %, based on the mixture of the crosslinking agents.

* * * * *

UNITED STATES PATENT AND TRADEMARK OFFICE
CERTIFICATE OF CORRECTION

PATENT NO. : 4,781,808

DATED : November 1, 1988

INVENTOR(S) : Michael Geist et al.

It is certified that error appears in the above-identified patent and that said Letters Patent is hereby corrected as shown below:

Abstract, lines 7-8, between "if appropriate" and "catalysts", insert --,--.

Column 1, line 12, between "if necessary" and "catalysts", insert --,--.

Column 1, line 35, between "preferred" and "extremely", insert --to--.

Column 4, line 61, delete "amoun:", and substitute therefor --amount--.

Column 5, line 51, delete "diisocyapates", and substitute therefor --diisocyanates--.

Column 6, line 57, delete "urethne" and substitute therefor --urethane--.

Column 6, line 67, delete "isocyanate obviously" and substitute therefor --isocyanate. Obviously--.

Column 7, line 61, delete "ff", and substitute therefor --of--.

Column 7, line 63, between "if appropriate" and "catalysts", insert --,--.

Column 8, line 28, delete "course 4" and substitute therefor --course of 4--.

Column 9, line 19, delete "epo.xide" and substitute therefor --epoxide--.

UNITED STATES PATENT AND TRADEMARK OFFICE
CERTIFICATE OF CORRECTION

PATENT NO. : 4,781,808

DATED : November 1, 1988

INVENTOR(S) : Michael Geist et al.

It is certified that error appears in the above-identified patent and that said Letters Patent is hereby corrected as shown below:

Column 9, line 36, delete "for hours", and substitute therefor --for 6 hours--.

Column 9, lines 37-38, delete "Cardura 10", and substitute therefor --Cardura E 10,--.

Column 11, line 40, between "aliphatic and "cycloaliphatic", insert --,--.

Column 12, line 30, between "aliphatic and "cycloaliphatic", insert --,--.

Column 12, line 34, between "amine" and "the", insert --,--.

Column 12, line 36, delete "polyisocyanates" and substitute therefor --polyisocyanate--.

Signed and Sealed this

Eighteenth Day of June, 1991

Attest:

HARRY F. MANBECK, JR.

*Attesting Officer*

*Commissioner of Patents and Trademarks*